United States Patent
Vinayagam et al.

(10) Patent No.: US 8,913,489 B2
(45) Date of Patent: Dec. 16, 2014

(54) SYSTEM AND METHOD FOR VIRTUAL FABRIC LINK FAILURE RECOVERY

(75) Inventors: Anand Vinayagam, Oak Park, CA (US); Roberto H. Jacob Da Silva, Oak Park, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 294 days.

(21) Appl. No.: 13/431,116

(22) Filed: Mar. 27, 2012

(65) Prior Publication Data

US 2012/0182866 A1    Jul. 19, 2012

Related U.S. Application Data

(63) Continuation-in-part of application No. 13/010,168, filed on Jan. 20, 2011, which is a continuation-in-part of application No. 13/010,343, filed on Jan. 20, 2011.

(60) Provisional application No. 61/370,622, filed on Aug. 4, 2010.

(51) Int. Cl.
| | | |
|---|---|---|
| *G01R 31/08* | (2006.01) | |
| *H04L 12/775* | (2013.01) | |
| *H04L 12/939* | (2013.01) | |
| *H04L 12/709* | (2013.01) | |
| *H04L 12/703* | (2013.01) | |
| *H04L 12/707* | (2013.01) | |

(52) U.S. Cl.
CPC .............. *H04L 45/245* (2013.01); *H04L 45/28* (2013.01); *H04L 45/58* (2013.01); *H04L 49/552* (2013.01); *H04L 45/22* (2013.01); *Y02B 60/33* (2013.01)
USPC ....... 370/225; 370/392; 370/395.53; 370/401

(58) Field of Classification Search
CPC ....... H04L 45/245; H04L 45/22; H04L 45/28; H04L 49/552; H04W 36/08
See application file for complete search history.

(56) References Cited

U.S. PATENT DOCUMENTS

2007/0005968 A1* 1/2007 Lu et al. ......................... 713/168
2008/0181196 A1* 7/2008 Regan et al. .................. 370/351
(Continued)

FOREIGN PATENT DOCUMENTS

EP           2242215 A1    10/2010

OTHER PUBLICATIONS

Haddock, et al.; Resilient Network Interconnect using Distributed Link Aggregation; IEEE Draft new-haddock-resilient-network-interconnect-LAG-0910-v3b; Oct. 5, 2010; pp. 1-40; vol. 802.1.

(Continued)

*Primary Examiner* — Jung Park
(74) *Attorney, Agent, or Firm* — Garlick & Markison

(57) ABSTRACT

Aggregation switches are connected to an edge node by a multi-chassis link aggregation group and a virtual fiber link provides a connection for exchange of information between the aggregation switches regarding MAC addressing to synchronize MAC address tables across the aggregation switches. When failure of the virtual fiber link is detected, the multi-chassis link aggregation group is reconfigured into two or more link aggregates with each link aggregate connecting the edge node to one of the aggregation switches. A spanning tree protocol is initiated over the link aggregates to prevent loops in the network. MAC address tables are flushed and relearned with the two or more link aggregates.

20 Claims, 13 Drawing Sheets

(56) References Cited

U.S. PATENT DOCUMENTS

| | | | |
|---|---|---|---|
| 2009/0254677 A1* | 10/2009 | Desanti | 709/242 |
| 2010/0157793 A1* | 6/2010 | Sajassi et al. | 370/228 |
| 2010/0246404 A1* | 9/2010 | Bradford et al. | 370/237 |
| 2012/0020373 A1* | 1/2012 | Subramanian et al. | 370/419 |
| 2012/0033541 A1 | 2/2012 | Jacob Da Silva et al. | |
| 2012/0033549 A1* | 2/2012 | Joshi et al. | 370/228 |

OTHER PUBLICATIONS

International Searching Authority; International Search Report and Written Opinion; International Application No. PCT/US13/031878; Jun. 4, 2013; 12 pgs.

* cited by examiner

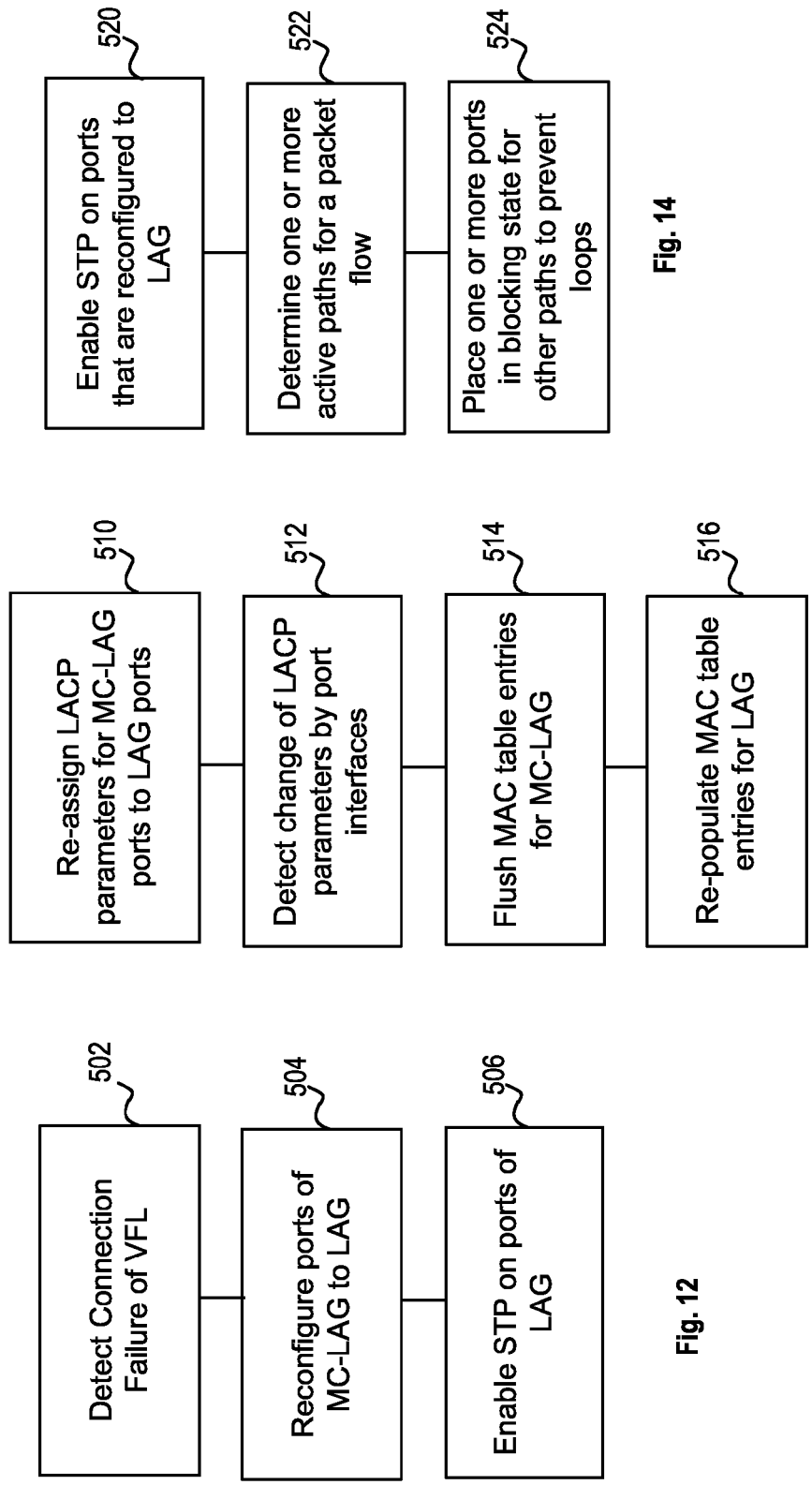

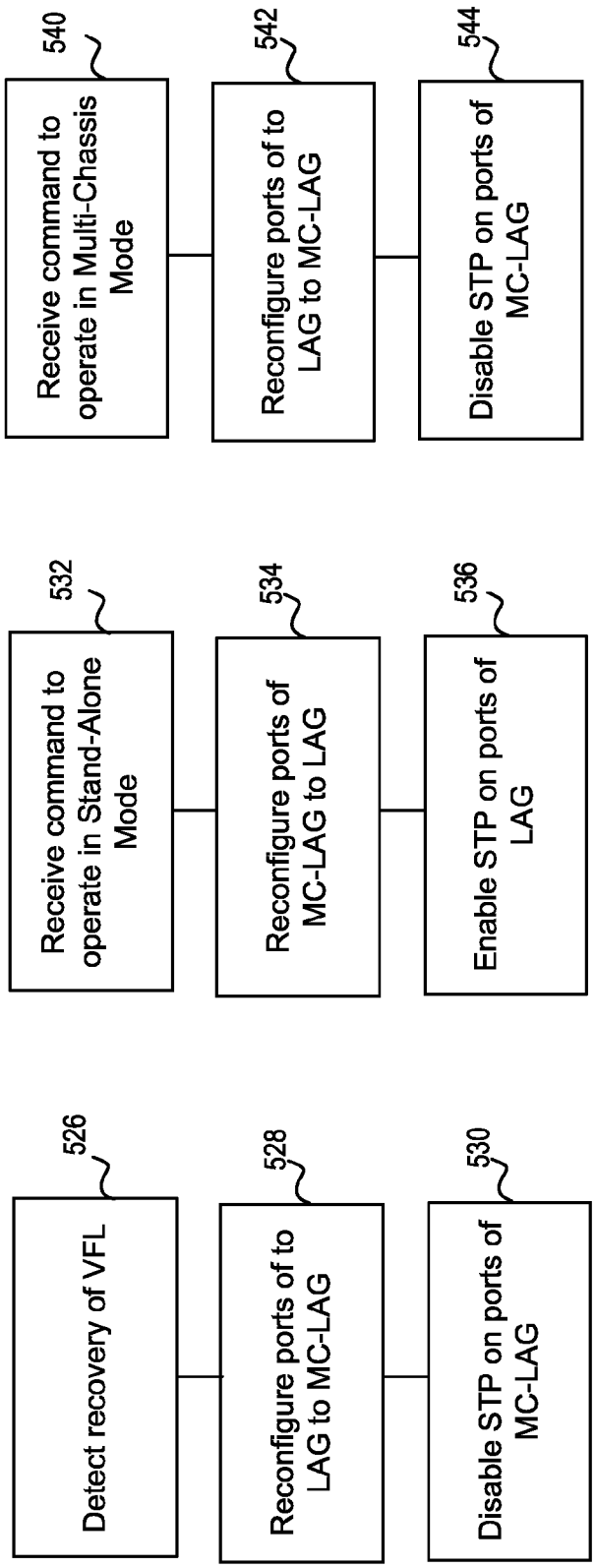

SYSTEM AND METHOD FOR VIRTUAL FABRIC LINK FAILURE RECOVERY

CROSS-REFERENCE TO RELATED PATENTS

The present U.S. Utility patent application claims priority pursuant to 35 U.S.C. §120 as a continuation in part application to U.S. patent application Ser. No. 13/010,168, entitled, "SYSTEM AND METHOD FOR MULTI-CHASSIS LINK AGGREGATION," filed Jan. 20, 2011, which is incorporated by reference herein and made part of the present U.S. Utility Patent Application for all purposes, which in turn claims priority under 35 U.S.C. §119(e) to U.S. Provisional Application Ser. No. 61/370,622, entitled, "MULTI-CHASSIS VITRUAL-FABRIC LINK AGGREGATION SYSTEM," filed Aug. 4, 2010, which is incorporated by reference herein and made part of the present U.S. Utility Patent Application for all purposes.

The present U.S. Utility Patent Application also claims priority pursuant to 35 U.S.C. §120 as a continuation in part application to U.S. patent application Ser. No. 13/010,343, entitled, "SYSTEM AND METHOD FOR TRANSPORT CONTROL PORTOCOL IN A MULTI-CHASSIS DOMAIN," filed Jan. 20, 2011, which is incorporated by reference herein and made part of the present U.S. Utility Patent Application for all purposes, which in turn also claims priority under 35 U.S.C. §119(e) to U.S. Provisional Application Ser. No. 61/370,622, entitled, "MULTI-CHASSIS VITRUAL-FABRIC LINK AGGREGATION SYSTEM," filed Aug. 4, 2010, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks allow many different computing devices, for example, personal computers, IP telephony devices or servers to communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network consists of an edge layer, an aggregation layer and a core layer (whereas a two tier network consists of only an edge layer and core layer). The edge layer of data networks includes edge (also called access) networks that typically provide connectivity from an Enterprise network or home network, such as a local area network, to a metro or core network. The edge/access layer is the entry point of the network, i.e., to which the customer network is nominally attached, and the switches residing at the edge layer are known as edge nodes. Different types of edge networks include digital subscriber line, hybrid fiber coax (HFC) and fiber to the home. Edge nodes may perform, for example, L2 switching functions for the attached devices. The edge nodes are generally connected to an aggregation layer that terminates access links coming from multiple edge nodes. Switches residing at the aggregation layer are known as aggregation switches. Aggregation switches may perform, for example, L2 switching and L3 routing of traffic received via the aggregate links from the edge nodes. The aggregation layer is connected to a metro or core network layer that performs Layer 3/IP routing of traffic received from the aggregation switches (in a three tier network) or from edge nodes (in a two tier network). As will be appreciated, nodes at each incremental layer of the network typically have larger capacity and faster throughput.

One of the key challenges faced by data networks is the need for network resiliency, i.e., the ability to maintain high availability despite periodic component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for routing traffic flows through the network. As will be appreciated, detection and convergence times must occur quickly (advantageously, less than one second) to achieve seamless transition to the alternate paths.

Ethernet protocol is a transport technology that is used ubiquitously in local area networks (LAN), such as the home and enterprise networks to communicate between computers and networks. However, the use of Ethernet protocol technology in access and aggregation networks, as well as metro networks, is continuing to rise and to revolutionize the edge network as it did in the enterprise network. As an access technology, Ethernet offers significant advantages over other access technologies, such as: (i) future-proof transport for data, video and voice applications; (ii) cost-effective infrastructure for data services; and (iii) simple, globally accepted standard that will ensure interoperability.

In order to adapt the Ethernet technology to a carrier-grade service environment in edge and aggregation layer networks, a number of issues remain to be addressed, including resiliency to failures. In one known solution, the spanning tree protocol (STP) is commonly used to detect failures and divert traffic to alternate paths when failures occur in Ethernet networks. Generally, STP relies on multiple physical paths between switches, but with only one path active at any one time for a particular packet flow, the other path being placed in a blocking mode (defining an "active/passive" paradigm). When failures occur, an alternative path is brought out of the blocking mode into an active state, thereby re-establishing the connection.

However, STP can result in unacceptable convergence times (e.g., up to several seconds) in some network topologies, including without limitation, convergence between edge nodes and aggregation switches of a data network. Further, STP provides only for an active/passive operation paradigm whereby not all links are actively forwarding traffic at the same time.

Accordingly, there is a need for systems and methods for providing resiliency between nodes of one or more data networks, such as without limitation, between edge nodes and aggregation switches of an Ethernet network. There is a need for systems and methods for providing a communication control protocol that is resilient and adaptable to various types of network nodes. There is a need for systems and methods to provide for recovery due to failure of one or more links in such networks.

BRIEF DESCRIPTION OF THE SEVERAL VIEWS OF THE DRAWINGS

FIG. 12 illustrates a logic flow diagram of an embodiment of a method for recovery when a connection failure occurs over the virtual fiber link in accordance with the present invention.

FIG. 13 illustrates a logic flow diagram of an embodiment of a method for reconfiguration of the multi-chassis link aggregate on an aggregation switch in accordance with the present invention.

FIG. 14 illustrates a logic flow diagram of an embodiment of a method for spanning tree protocol (STP) enablement by an aggregation switch in accordance with the present invention.

FIG. 15 illustrates a logic flow diagram of an embodiment of a method for returning to multi-chassis mode by the aggregation switch when the VFL is operational in accordance with the present invention.

FIG. 16 illustrates a logic flow diagram of an embodiment of a method for operating in stand-alone mode by an aggregation switch in accordance with the present invention.

FIG. 17 illustrates a logic flow diagram of an embodiment of a method for operating in multi-chassis mode by an aggregation switch in accordance with the present invention.

DETAILED DESCRIPTION OF THE INVENTION

Figure 1:
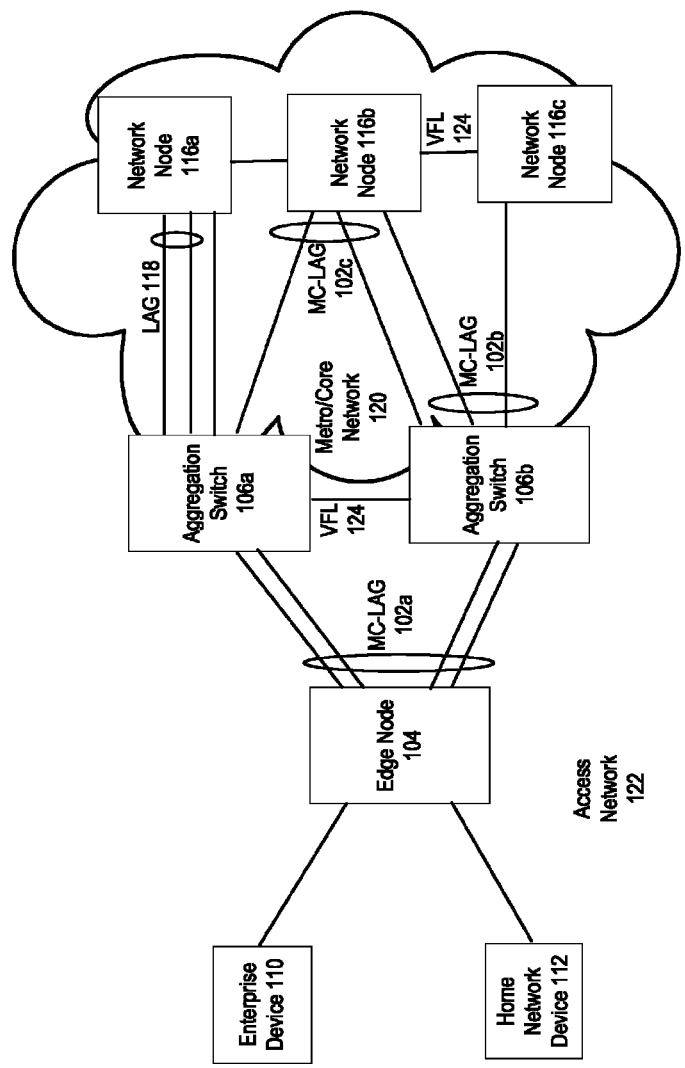
FIG. 1 illustrates a schematic block diagram of an embodiment of a network architecture in accordance with the present invention.

FIG. 1 illustrates an embodiment of a resilient network 100 with multi-chassis link aggregation that provides an active/active paradigm (i.e., all links actively forwarding traffic at the same time) that more fully utilizes the capacity of the network nodes. The following abbreviations are used herein:
CMM Chassis Management Module
LAG Link Aggregation
L2 Layer 2 ("Data Link Layer") of the OSI model for networks
L3 Layer 3 ("Network Layer") of the OSI model for networks
MAC Media Access Control Protocol
MC-LAG Multi-Chassis Link Aggregate Group
MC-VFA Multi-Chassis Virtual Fabric Aggregation
NIM Network Interface Module
STP Spanning Tree Protocol
VLAN Virtual Local Area Network
ASIC Application Specific Integrated Circuit The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; 2) IEEE Std. 802.1Q, Virtual Bridged Local Area Networks, 2005 edition; and 3) IEEE 802.1D Standard for Local and metropolitan area networks: Media Access Control (MAC) Bridges, 2004 edition.

The Link Aggregation Control Protocol (LACP) provides a method to control the bundling of several physical links, called a link aggregation group (LAG), between two peer nodes to form a single logical channel there between. The peer nodes negotiate the bundling of the physical links into a LAG by exchanging LACP packets, or alternatively the LAG can be configured manually. Link aggregation offers an inexpensive way to transfer more data than any one single port or link can deliver alone. In an embodiment, the ports of a LAG include the same physical type, such as all copper ports (CAT-5E/CAT-6), all multi-mode fiber ports (SX), or all single-mode fiber ports (LX). In another embodiment, the ports of a LAG may have a different physical type.

To provide increased resiliency and remove a single point of failure, a LAG is split across two devices as seen in FIG. 1 and is referred to herein as a multi-chassis link aggregation group (MC-LAG) 102. For example, in FIG. 1, MC-LAG 102a originates from edge node 104 and is split into two subsets and connected to two Aggregation switches 106a and 106b, with one or more physical links of the MC-LAG 102a in each subset. In an embodiment, the edge node 104 may use load balancing techniques to distribute traffic across all available links of the MC-LAG 102a. For each packet transmitted over the MC-LAG 102a, one of the physical links is selected based on a load-balancing algorithm (usually involving a hash function operating on the source and destination Internet Protocol (IP) or Media Access Control (MAC) address information). Load balancing across the physical links of the MC-LAG 102 results in a more effective use of bandwidth.

As seen in FIG. 1, the edge node 104 is connected over an access network 122 to an enterprise network device 110, such as a bridge, switch, router, etc., that is operating in a LAN, and/or it may also be connected to a home network device 112, such as a DSL modem, set-top box, optical line terminal, etc. The edge node 104 is a switch or server and may functionally include a digital subscriber line access multiplexer (DSLAM), cable 1 termination system (CMTS), optical line terminal (OLT), etc. in an embodiment but may include other types of devices as well.

In an embodiment, aggregation switches 106 are coupled with a virtual fabric link (VFL) 124. The VFL 124 provides a connection for exchange of information between the aggregation switches 106 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the MC-LAGs 102 connected thereto. The aggregation switches 106 operate transparently to the edge node 104 and are treated as a single logical device by the edge node 104. The edge node 104 is able to actively forward traffic on the MC-LAG 102a while the synchronization of MAC address tables and other forwarding information between the aggregation switches 106 is driven by Layer 2 (L2) packet flows over the VFL 124 along with a reduced amount of control messaging in an embodiment. This feature enables dual homing of the edge node 104 to the pair of aggregation switches 106 and provides a Layer 2 multi-path intra-structure as well as basic Layer 3 access infra-structure.

In addition, in an embodiment, this Multi-Chassis Virtual Fabric Aggregation (MC-VFA) feature provides this functionality without requiring Layer 2 redundancy protocols (e.g. Spanning Tree) between the edge node 104 and aggregation switches 106, while still facilitating a carrier-grade detection and convergence time to edge uplink failures as well as aggregation/core switch failures. Many recent network designs, especially for data centers, are requiring an ever increasing number of layer 2 adjacencies between edge nodes and aggregation switches. This trend is pushing the limits of the spanning tree protocol, such as loop-detection function and convergence times. The spanning tree convergence time can be of up to several seconds in many current network topologies. The multi-chassis architecture in an embodiment provides a dual-homed, layer 2 multi-path connection between the edge node 104 and aggregation switches 106 preferably without needing to run the spanning tree protocol operation for loop prevention, while still being flexible enough to allow the spanning tree protocol operation along with the multi-chassis functionality in some of the portions of the network topology in an embodiment (e.g. between the aggregation switches over the VFL 124 as well as over the links connecting the aggregation switches to core network nodes 116 or other switches/routers).

An advantage of the MC-VFA architecture in an embodiment is the active/active forwarding mode of the edge node 104 whereby both sets of MC-LAG uplinks to aggregation switch 106a and aggregation switch 106b are processing traffic to increase efficiency of the use of bandwidth of the MC-LAG links. The feature also facilitates fast fail-over detection and convergence times for access uplink failures and node failures in an embodiment. In addition, an embodiment is described herein for a mechanism for recovery in the event of a failure of the VFL 124.

As seen in FIG. 1, in an embodiment, the aggregation switches 106 are also connected to a metro or core network 120 that includes one or more network nodes 116, such as network switches and/or routers, using the MC-LAG functionality (as part of the MC-VFA architecture) as described herein. For example, aggregation switch 106b is connected to network nodes 116b and 116c over MC-LAG 102b wherein the network nodes 116b and 116c exchange state information over a VFL as well. The MC-LAG 102b architecture provides a dual-homed, layer 2 multi-path connection between the aggregation switch 106b and network nodes 116b and 116c. In an embodiment, network nodes 116 can also be connected using MC-LAG functionality, as seen with MC-LAG 102c and VFL 124. The Aggregation switches 106 may also be connected to the network nodes 116 using a standard LAG, such as LAG 118, or other trunks or links.

Figure 2:
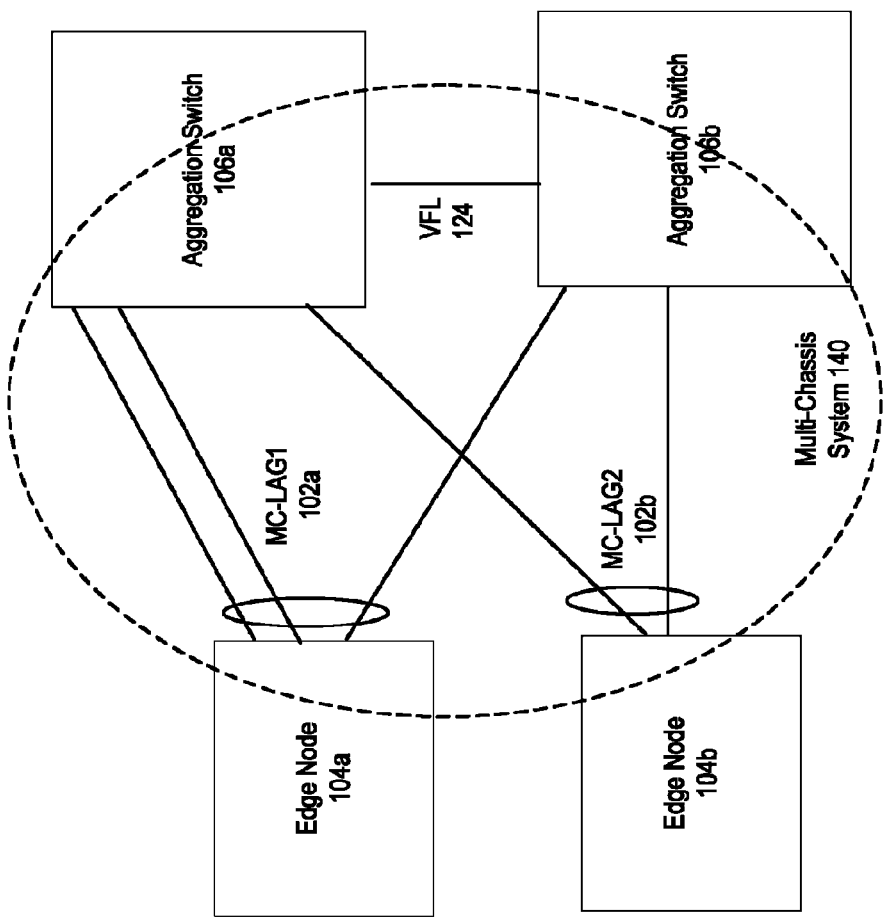
FIG. 2 illustrates a schematic block diagram of an embodiment of a multi-chassis system in accordance with the present invention.

The MC-VFA architecture is now described in more detail with respect to FIG. 2. Edge node 104a is connected to aggregation switches 106a and 106b by a first MC-LAG1 102a while edge node 104b is connected to aggregation switches 104a and 104b by second MC-LAG2 102b. Each MC-LAG 102a and 102b includes a plurality of physical links divided into at least two subsets, wherein each of the two subsets includes at least one physical link. As seen in FIG. 2, the first set of MC-LAG 102a physical links are terminated at a first aggregation switch 106a while the second set of MC-LAG 102a physical links are terminated at a second aggregation switch 106b. MC-LAG1 forms logical dual homed, layer 2 multi-paths. The MC-LAG member ports are the external, user ports that are members of the MC-LAG 102. The VFL 124 is a link aggregate (LAG) that in an embodiment spans multiple network interface modules on each aggregation switch 106 for resiliency and provides for inter-chassis traffic and control/state data transfer. The multi-chassis system 140 includes the aggregation switches 106, the virtual fabric link 124, at least one of MC-LAGs 102a and 102b and their respective MC-LAG member ports attached to the corresponding downstream edge node 104. The aggregation switches 106a and 106b are separate physical switches with each operable as a stand-alone switch and each encased by its own separate physical chassis. The aggregation switches 106a and 106b may be in the same geographic area, such as in a central office or data center, or may be in separate geographic locations, such as in different buildings or cities, to provide geo-diversity.

The edge nodes 104 operating as MC-LAG clients attached to the aggregation switches 106 can use different methods to assign traffic to their links of the MC-LAG preferably as long as the choice of links remains fixed for a given packet flow. This ensures that traffic is delivered in-sequence between any pair of communicating end stations. In an embodiment, the same number of uplink ports from the edge devices to each one of the MC-LAG aggregation switches is preferably configured. In other words, if two uplinks are configured for the MC-LAG between the edge node and one of the aggregation switches, then two uplinks for the MC-LAG between the edge node and the other aggregation switch should also be configured. Although not mandatory, this arrangement provides a more homogeneous traffic distribution for flows between the aggregation switches and the edge node.

Figure 3:
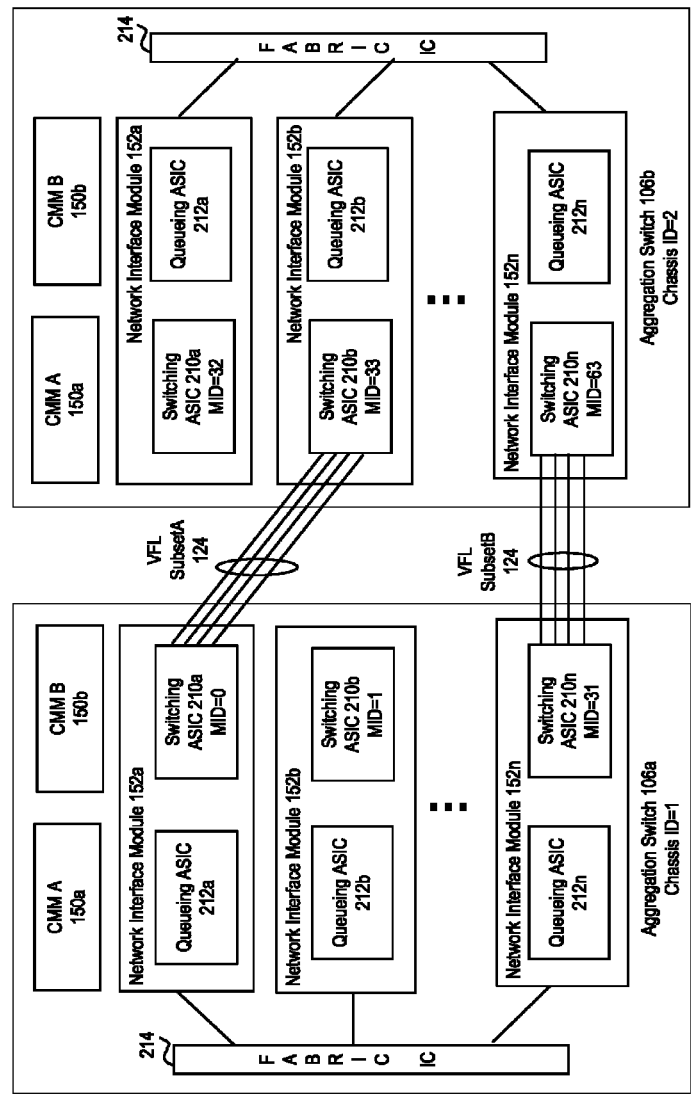
FIG. 3 illustrate a schematic block diagram of an embodiments of aggregation switches in a multi-chassis system in accordance with the present invention.

The Virtual fabric link (VFL) 124 between the aggregation switches 106 is now described in more detail with respect to FIG. 3. The aggregation switches 106 in one embodiment each include at least one control management module (CMM) 150a (primary) and preferably a second CMM module 150b (back-up) as well as a plurality of Network Interface modules (NIM) 152, such as line cards or port modules. The VFL 124 is an aggregate of VFL member ports connected to one or more NIMs 152, in the first and second aggregation switches 106. For example, VFL 124 includes a first subset A of physical links between NIM 152*a* of aggregation switch 106*a* and NIM 152*b* of aggregation switch 106*b*, and a second subset B of physical links between NIMs 152*n* of aggregation switch 106*a* and 106*b*. In an embodiment, the VFL links are connected between Switching ASICs 210 residing in the NIMs 152 of the Aggregation switches 106. The NIMs 152 each also include a Queuing ASIC 212, described further below. A switching fabric integrated circuit (IC) 214 provides an interconnection between the various NIMs 152 in the aggregation switch 106.

A unique chassis identifier is assigned to each aggregation switch 106 in the multi-chassis system. The Chassis ID for each aggregation switch 106 is unique and global, e.g. each aggregation switch is aware of the chassis ID of its peer aggregation switch. Unique hardware device identifiers (MIDs) for various components, such as IC, NIM, CMM, in each aggregation switch 106 are also generated allowing for management of local and remote objects. In an embodiment, the hardware device identifiers for the Switching ASICs 210 have global significance within the multi-chassis system while MIDs for other components, such as Queuing ASICs 212, may have only local significance. For example, the hardware device identifiers' assigned to the Switching ASICs 210 are known by both aggregation switches 106 while hardware device identifiers for other devices are restricted to a local aggregation switch and have no significance to the remote aggregation switch.

In an embodiment, the Switching ASICs 210 are assigned a global unique hardware device identifier (MID) in a range assigned to its Aggregation switch, such as:

Aggregation switch 106*a*: Chassis ID=1 and MID values 0-31

Aggregation switch 106*b*: Chassis ID=2 and MID values 32-63

Exemplary MIDs assigned to Switching ASICs 210 are shown in FIG. 3. By knowing the assigned range, a module is able to determine the location of a switching ASIC from its MID as in aggregation switch 106*a* or in aggregation switch 106*b*.

Figure 4:
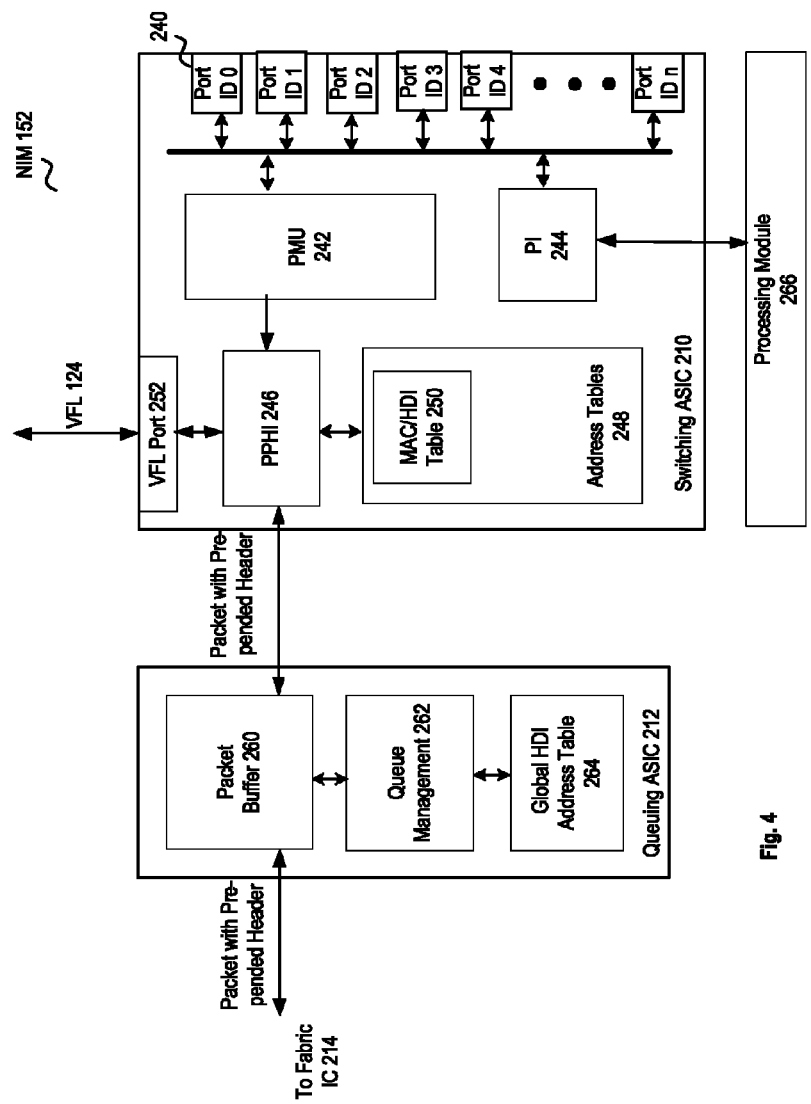
FIG. 4 illustrates a schematic block diagram of an embodiments of a network interface module of an aggregation switch in a multi-chassis system in accordance with the present invention.

In an embodiment, the Switching ASICs 210 operates in a pre-pended header mode to exchange data and control packets between the aggregation switches 106. FIG. 4 illustrates a schematic block diagram of an embodiment of a network interface module (MM) 152 in more detail. The Switching ASIC 210 includes a plurality of external port interfaces 240 that are connected to external nodes, such as edge nodes 104*a* and 104*b*. One or more of the external port interfaces 240 may include member ports for a MC-LAG, LAG or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned an external port interface identifiers (Port ID), e.g., device port values, such as gport and dport values, associated with the Switching ASICs 210. In an embodiment, MIDs of the Switching ASICs 210 and an external port interface identifiers for external ports 240 on the Switching ASICs 210 are used to uniquely identify a physical external port interface 240 of a Switching ASIC 210 on either the local or remote aggregation switch 106 in the multi-chassis system 140. In another embodiment, a Port Manger that includes a conversion module or other entity may convert the MIDs of the Switching ASICs 210 and external port identifiers into a single integer value, to generate a global port value (GPV), e.g. MID 4; device port identifier (dport) 5 converts to GPV 20. In either example, unique external port identifiers for the external ports of NIMs 152 in both the local and remote aggregation switches are generated. Unique port identifiers may also be assigned to internal ports of a Switching ASIC 210, such as an internal port from the Switching ASIC 210 to a processing module on the NIM 152. These internal ports are also uniquely identified by the port identifier and the MID of the Switching ASIC.

The Switching ASIC 210 further includes a packet management unit (PMU) 242 that determines a destination address of incoming packets. The packets may be switched to another external port interface 240 of the Switching ASIC 210, to the Queuing ASIC 212 for transmission to another NIM 152 on the local or remote aggregation switch, or to the processor interface (PI) 244 for transmission to a processing module 266 of the NIM 152 external or internal to the Switching ASIC 210.

When a packet is to be transmitted to another NIM 152 on the local or remote Aggregation switch, in an embodiment, the Switching ASIC 210 transfers the packet to a pre-pended packet header interface (PPHI) that adds or otherwise modifies the packet header to include hardware device information (HDI). The HDI includes identifiers of hardware devices associated with the source and/or the destination of the packet. In an embodiment, the pre-pended header may include other information such as packet priority and load balance identifiers. To obtain destination HDI information, the PPHI performs a look-up process to MAC/HDI forwarding table 250. The MAC/HDI forwarding table 250 stored in the address table memory 248 includes a list of MAC address entries, such as MAC address for external devices, nodes, modules, software or hardware connected to the aggregation switch 106. The MAC address entries include associated hardware device information used in bridging or routing a packet to reach a device with the associated MAC address. The destination hardware device information includes, for example, the port identifier and MID of a Switching ASIC 210 (e.g. MID=24, port ID=5 or MID=54, device port=12), of either the local or peer Aggregation switch, associated with the destination MAC address. In another embodiment, the destination hardware device information may include the global port value (GPV) of the external port interface associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the Queuing ASIC of the NIM 152 as well.

In an embodiment, when the Switching ASIC 210 includes an active VFL member port 252 with a link to the remote Aggregation switch, the MAC/HDI forwarding table 250 may include additional HDI information, such as a table to associate gport values into Switching ASIC MID values and device port values and/or a table with logical aggregate group identifiers mapping to external port interfaces.

In an embodiment, the pre-pended header includes hardware device information HDI associated with the source port, such as an external or internal port interface, including hardware device identifier MID of the Switching ASIC and device port identifier of the source port).

In another embodiment, the pre-pended header includes HDI associated with a Switching ASIC 210 connected to the VFL port 124 (such as MID=0 or MID=31 for Aggregation switch 106*a* in FIG. 3). The Switching ASIC 210 connected to the VFL port will then translate or convert the HDI in the pre-pended header before transmitting the packet over the VFL.

In an embodiment, the PPHI 246 also appends source hardware device information associated with the source port, e.g. the external port interface 240 that first received the packet. The source hardware device information may include the MID of the Switching ASIC 210 and the port identifier (e.g., device port) and/or global port value (GPV) of the external port interface 240. Additional information, such as destination hardware device identifier or MID, a destination device port, VLAN ID, packet type (multicast, unicast, broadcast), packet priority and load balance identifier is also added to the pre-pended header in an embodiment. In an embodiment, the destination HDI is retrieved from the address tables 248, such as MAC/HDI forwarding table 250.

The packet with the pre-pended header is then transmitted to the Queuing ASIC 212 for routing over the Fabric IC 214. The Queuing ASIC 212 includes a packet buffer 260, a queue management 262 for providing traffic and buffer management and a global HDI address table 264. The global HDI address table 264 maps the destination HDI to the appropriate queues in Queuing ASICs 212 in one or more of the other NIMs 152. For example, the mapping provides information for switching the packet into an appropriate egress queue for one or more of the external port interfaces in other Queuing/Switching ASICs in the Aggregation switch 106 based on the hardware device information in the pre-pended header. In another example, when the destination HDI indicates a destination on the remote Aggregation switch (i.e. the destination device identifier belongs to a remote/peer switch range), the Queuing ASIC 212 switches the packet to an appropriate egress queue for one or more of the VFL port interfaces in the local Aggregation switch 106 for transmission to the remote Aggregation switch over the VFL 124, e.g. the global HDI address table 264 indicates that the associated hardware device is located on the remote Aggregation switch. In an embodiment, the determination of the egress queue corresponding to a particular VFL port interface is made based on the load balance identifier present in the pre-pended header and inserted previously by the switching ASIC 210.

Though the switching ASIC 210 and Queuing ASIC 212 are illustrated as separate integrated circuits or modules, one or more functions or components of the ASICs may be included on the other ASIC or combined into an alternate ASIC or otherwise be implemented in one or more integrated circuits.

Figure 5:
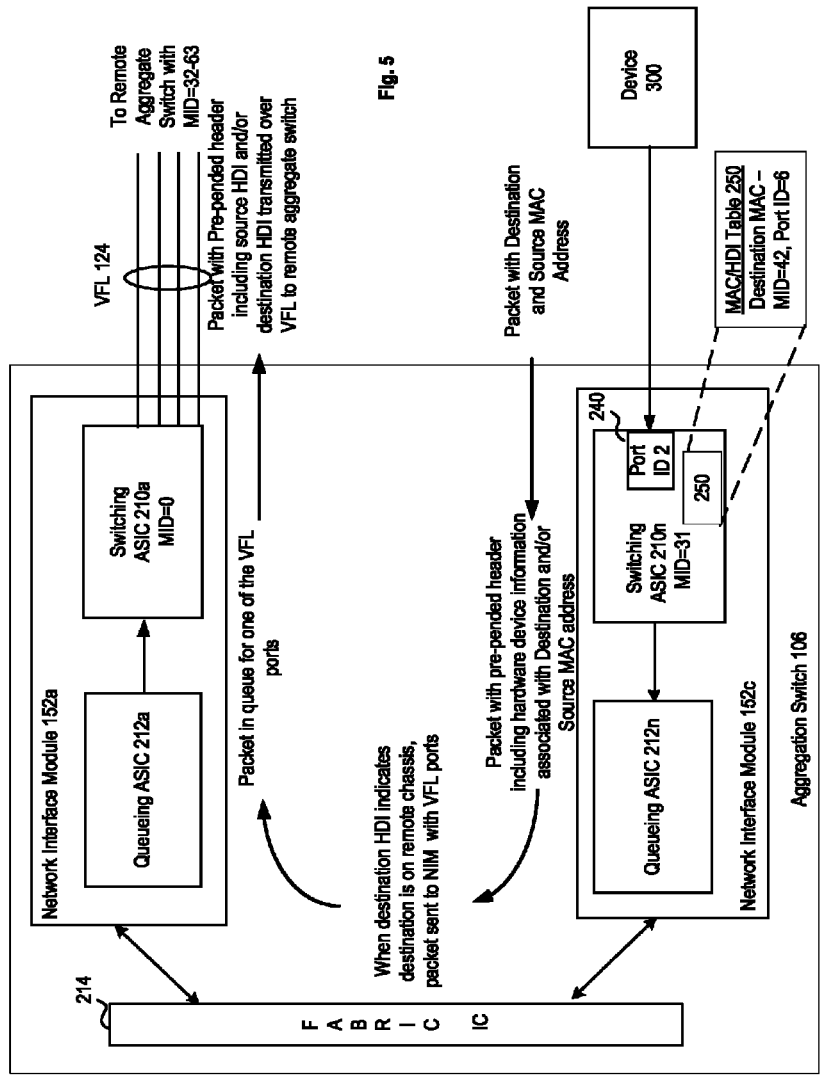
FIG. 5 illustrates a schematic block diagram of an embodiment of packet flow through an aggregation switch in a multi-chassis system in accordance with the present invention.

FIG. 5 illustrates a schematic block diagram of an embodiment of a packet flow through Aggregation switch 106*a* to VFL 124. In this example, a device 300 with source MAC address, such as enterprise device 110 or home network device 112, transmits a packet, e.g. through edge node 104, to aggregation switch 106*a* with a destination MAC address of a device that may be accessed over an external port interface of the remote Aggregation switch 106*b*. Switching ASIC 210*n*, e.g. with MID=31 in FIG. 5, in NIM 152*n* receives the packet on an external port interface 240, e.g. with port ID=2. The Switching ASIC 210*n* extracts a destination MAC address and performs an address table look-up to determine hardware device information (HDI) associated with the destination MAC address from MAC/HDI forwarding table 250. The destination HDI may include, e.g., device module identifiers (MIDs) of one or more hardware components in a path to the destination device with the MAC address, such as NIMs 152, Queuing ASICs 212, Switching ASICS 210, external port identifiers 240, member ports of the VFL 124, of either the local aggregation switch 106*a* or remote aggregation switch 106 b. In an embodiment, the destination HDI may include the MID of the Switching ASIC 210 and port identifier (e.g., device port) of the external port interface 240 that provides access to the destination device. Furthermore, in an embodiment, the pre-pended header includes a packet priority and a load balance identifier determined based on parameters retrieved from the original packet (source MAC address, destination MAC address, source IP address, destination IP address). In another example, the HDI includes a global port value (GPV) for the external port interface 240 or MID of the NIM 152 that provides access to the destination device. In another embodiment, when the destination MAC address is associated with the remote aggregation switch, the HDI includes the hardware device identifier MID for the NIM 152*a* or Switching ASIC 210 (such as MID=0) connected to the VFL 124. The destination HDI is added to a pre-pended header that adds information to the original packet header (such as a layer 2, Ethernet packet header type). The Switching ASIC 210*n* also includes source hardware device information (HDI) for one or more devices associated with the originating external port interface, e.g. port ID=2. The source HDI includes one or more hardware device identifiers, such as MID of the originating Switching ASIC 210, source port identifier (e.g. device port), global port value, MID for source NIM 152, Chassis ID, etc.

The packet with pre-pended header is transmitted to the Queuing ASIC 212*n* which then determines a NIM 152 on the local Aggregation switch to transmit the packet based on the destination HDI. When the destination HDI indicates a local external port interface on the aggregation switch 106*a* (e.g. based on the destination MID contained in the pre-pended header), the Queuing ASIC 212*n* places the packet in an egress queue for transmission to the corresponding NIM 152 of the local external port interface. In another example illustrated in FIG. 5, the Queuing ASIC 212*n* determines that the destination HDI indicates a destination hardware device on the remote aggregation switch, e.g. the HDI indicates Switching ASIC with MID=45 on the remote aggregation switch. To reach the remote aggregation switch, the packet is transmitted to a NIM 152 connected to the VFL 124. In this example, the Queuing ASIC 212*n* transmits the packet with pre-pended header over the Fabric IC 214 to NIM 152*a* connected to the VFL 124. The selection of a VFL member port is made based on the load balance identifier parameters carried on the pre-pended header. The Queuing ASIC 212*a* in NIM 152*a* receives the packet with pre-pended header and queues the packet for transmission over the VFL 124. The Switching ASIC 210*a* then transmits the packet with pre-pended header including the source and/or destination HDI to the remote aggregation switch over the VFL 124.

In an embodiment, the Switching ASIC 210*a* may alter the pre-pended header prior to transmission over the VFL 124. For example, the Switching ASCI 210*a* may translate a destination HDI with local significance (e.g., a gport value or local hardware device identifier MID) to an HDI with global significance. The Switching ASIC 210*a* then transmits the packet with pre-pended header including the source and/or destination HDI to the remote Aggregation switch over the VFL 124.

In an embodiment, when multiple Switching ASICs 210 of an Aggregation switch 106 are connected to the VFL 124, e.g. in FIG. 3, Switching ASICs MID=0 and MID=31, the traffic to be transmitted over the VFL 124 may be distributed. For example, a load balance identifier map table in the Global HDI Address Table 264 of the Queuing ASIC 212 would indicate the following distribution:

| Destination MID | Outgoing Port | MID's Device Location |
|---|---|---|
| [0-31] | VFL 124 | Local |
| [32-63] | VFL 124 | Remote |

The Queuing ASICs 212 map the packets to the appropriate VFL port interface using the load balance identifiers or other load balancing techniques. For example, in an embodiment with 8 NIMs 152 in the aggregation switch 106, the Queuing ASIC 212n has a set of 8 queues configured for the 8 NIMs (Module ID, Port). In an embodiment, the Queuing ASICs 212 connected to the VFL 124 have a separate set of queues related for the VFL member port interfaces. The set of queues for the VFL is assigned to the FIFOs associated with the internal VFL ports connecting the aggregation switches 106. In an embodiment, with multiple Virtual Fabric Link member ports, the queues are assigned such that the destination ports on the remote chassis are equally distributed among the Queuing ASICs 212a and 212n that host the VFL member ports.

In an embodiment, the MAC/HDI forwarding tables in the NIMs 152 are populated and then updated in response to layer 2 packets flow through the system. Since the pre-pended header includes source MAC address and source HDI information, the NIMS 152, e.g. in specific the Switching ASICs 210 in an embodiment, are able to populate the MAC/HDI forwarding table 250 with this information. By operating in a pre-pended header mode to exchange Layer 2 packets with source MAC addresses and source HDI over the VFL 124, the Switching ASICs 210 are able to synchronize MAC address tables between the aggregation switches 106. Though the MAC/HDI forwarding table is described in the Switching ASICs 210, the MAC/HDI forwarding table may be included, alternatively or in addition to, in the Queuing ASICs 212n or in another module of the NIM 152. In another embodiment, the CMM 150 (primary and secondary) may also include a MAC/HDI forwarding table for one or more types of links between the aggregation switches 106.

Figure 6:
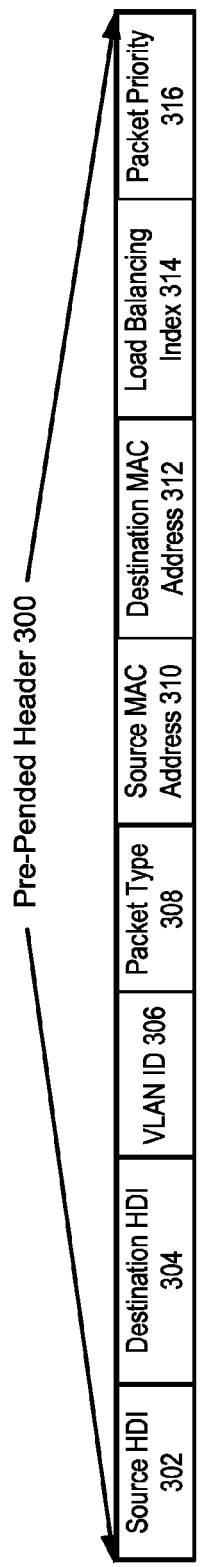
FIG. 6 illustrates a schematic block diagram of an embodiment of source address learning in a multi-chassis system in accordance with the present invention.

FIG. 6 illustrates a schematic block diagram of an embodiment of a pre-pended header of a packet in the multi-chassis system. The pre-pended header 300 includes fields for source HDI 302, destination HDI 304, VLAN ID 306, packet type 308, source MAC address 310, destination MAC address 312. In an embodiment, the pre-pended header may also include, load balance identifier 314 and packet priority 316. The destination HDI 304 includes, for example, the port identifier and MID of a Switching ASIC 210 (e.g. MID=24, port ID=5 or MID=54, device port=12), of either the local or peer Aggregation switch, associated with the destination MAC address. In another embodiment, the destination hardware device information may include the global port value (GPV) of the external port interface associated the destination MAC address. The destination hardware device information may also include MID of the Switching ASIC 210 connected to the VFL, NIMs 152, Queuing ASICs, etc. The source HDI 302 may include the MID of the Switching ASIC 210 and the port identifier (e.g., device port) and/or global port value (GPV) of the external port interface 240. The load balance identifier 314 is used to help the Queuing ASIC 212 to decide which VFL member port to be used as a transit/gateway port to reach the peer Aggregation switch. The packet priority 316 is used by the Queuing ASIC 212 to determine the specific priority queue.

Figure 7:
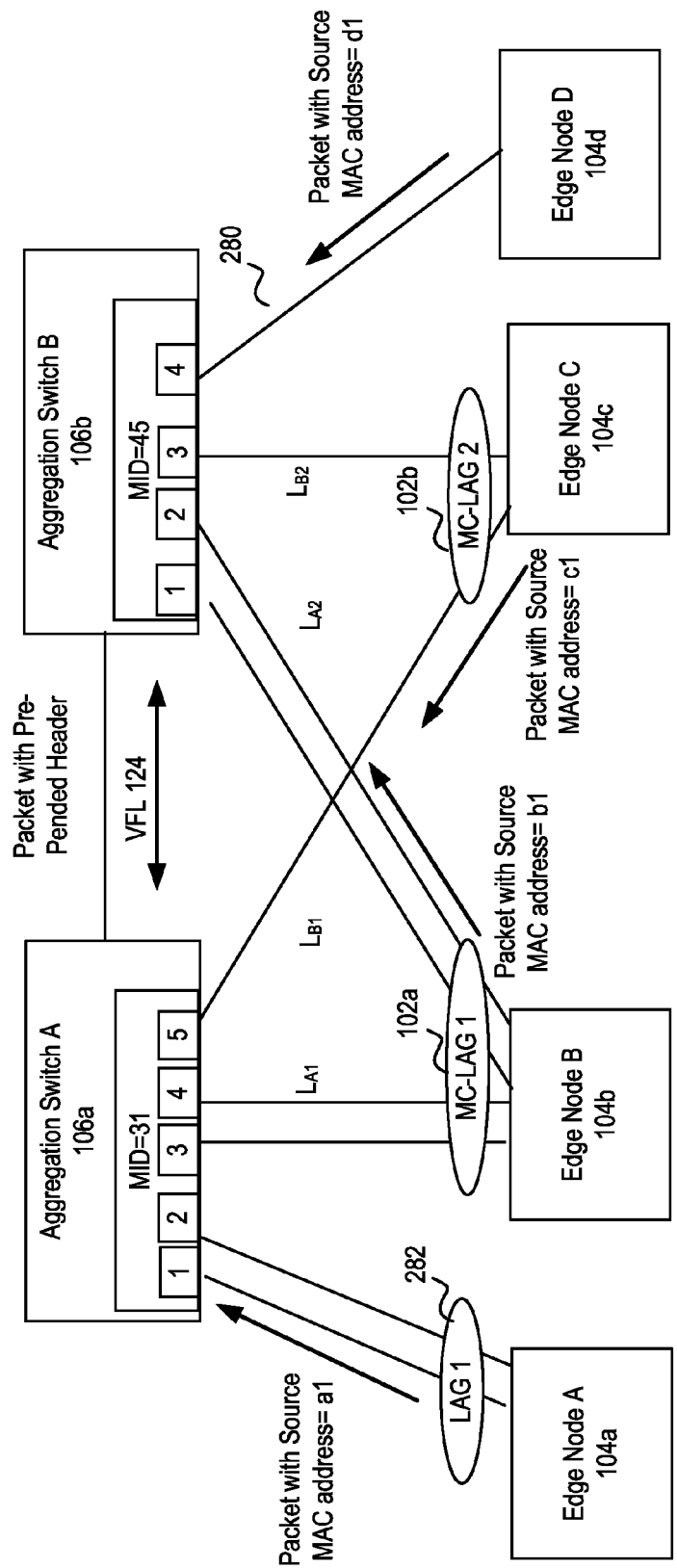
FIG. 7 illustrates a schematic block diagram of an embodiment of a pre-pended header of a packet in the multi-chassis system in accordance with the present invention.

FIG. 7 illustrates a schematic block diagram of an embodiment of a multi-chassis system that illustrates source MAC learning. Edge nodes 104 are connected to aggregation switches 106a and 106b over logical aggregate group LAG1 282, multi-chassis logical aggregate group MC-LAG1 102a, multi-chassis logical aggregate group MC-LAG2 102b and fixed port link 280. In an embodiment, the aggregation switches 106 communicate configuration information for logical aggregate groups, such as LAG1 and other types of trunk groups, and hardware device information associated thereto. In an embodiment, the hardware device information includes physical ports associated with the logical aggregate groups, e.g. hardware device or module identifiers (MID) of Switching ASICS and external port identifiers for links associated with the logical aggregate groups (device port values or gport values).

For example, in an embodiment, aggregation switch A notifies aggregation switch B that the logical aggregate group with aggregate group identifier LAG1 is associated with a Switching ASIC having a hardware device module identifier MID=31 and external port interface with identifier device port=1, 2. Aggregation switch B notifies Aggregation switch A that the logical aggregate group with aggregate group identifier MC-LAG1 is associated with a Switching ASIC having hardware device module identifier MID=45 and external port interface identifier device port=1, 2. Other hardware device information, such as identifiers of NIMs, Queuing ASICs, etc. associated with the logical aggregate groups may be exchanged alternatively or in addition to the Switching ASIC's MIDs and device port values. The aggregation switches 106 also exchange notifications of updates to the configuration information of the logical aggregate groups for both ordinary aggregates and multi-chassis aggregate groups. The hardware device information associated with the logical aggregate groups and multi-chassis aggregates of the aggregation switches 106 is included in one or more of the MAC/HDI forwarding tables in NIMs 152 of the aggregation switches 106. For example, in an embodiment, one or more of the MAC/HDI forwarding tables in both aggregation switches 106 includes the following information:

| Type of Aggregate Group | Aggregate Group Identifier | HDI List of VFL Member Ports |
|---|---|---|
| LAG | LAG1 | (MID = 31, Port ID = 1) |
|  |  | (MID = 31, Port ID = 2) |
| MC-LAG | MC-LAG1 | (MID = 31, Port ID = 3) |
|  |  | (MID = 31, Port ID = 4) |
|  |  | (MID = 45, Port ID = 1) |
|  |  | (MID = 45, Port ID = 2) |
| MC-LAG | MC-LAG2 | (MID = 31, Port ID = 5) |
|  |  | (MID = 45, Port ID = 3) |

Since the same aggregate group identifiers for logical aggregate groups (e.g. LAG1) are known and utilized by both Aggregation switches 106, in an embodiment, the multi-chassis system assigns a subset of aggregate group identifiers to each type of logical group and for each of the Aggregation switches 106. For example, in an embodiment with a maximum of 128 possible aggregate groups, an assignment of aggregate group identifiers would include:

| Type of Aggregate Group | Aggregation switch | Range Configuration | Range Default | Example |
|---|---|---|---|---|
| LAG | chassis 1 | MIN_LAG_ID_LOCAL MAX_LAG_ID_LOCAL | [0-47] | [0-100] |
| LAG | chassis 2 | MIN_LAG_ID_REMOTE MAX_LAG_ID_REMOTE | [48-95] | [101-120] |
| MC-LAG | Both chassis | MIN_MC-LAG_ID MAX_MC-LAG_ID | [96-127] | [121-127] |

The aggregation switches 106 assign aggregate group identifiers based on the assigned ranges and type of aggregate group. As such, packet forwarding in the aggregation switches 106 is performed by accessing the MAC/HDI forwarding tables and using the mapping between the logical aggregate groups and hardware device information. Typically, aggregate identifier information is not transferred in the pre-pended headers.

In an embodiment, to facilitate load balancing over a LAG or MC-LAG, when an aggregation switch 106 receives a packet over the VFL 124 with destination HDI information, such as (MID, Port ID), the aggregation switch 106 determines whether the destination HDI is included in a logical aggregate group by searching for the port identified in the source HDI (destination MID, destination Port identifier) in one or more of its internal trunk tables that contain a list of all ports that are active members of each LAG or MC-LAG aggregate group. When a destination port is found in an associated LAG or MC-LAG, the aggregation switch 106 may perform load balancing techniques by assigning the packet to one or more different external port interfaces of the associated LAG. For example, when Switching ASIC 210 connected to the VFL in the remote aggregation switch 106b receives a packet with destination HDI of MID=45, port 2, the switching ASIC 210 determines from its MAC/HDI table, an example shown below, that MID=45, port 2 is part of MC-LAG1. The switching ASIC may then decide to perform load balancing and determine through one or more hash algorithms to transmit the packet over MID=45, port 1 of MC-LAG1 instead. In this particular example, the switching ASIC will then strip off the pre-pended header prior to transmitting the packet out of the external port (MID=45, port 1).

| Aggregation switch A | |
|---|---|
| LAG ID | HDI |
| LAG1 | (MID = 31, Port ID = 1) |
| | (MID = 31, Port ID = 2) |
| MC-LAG1 | (MID = 31, Port ID = 3) |
| | (MID = 31, Port ID = 4) |
| | (MID = 45, Port ID = 1) |
| | (MID = 45, Port ID = 2) |
| MC-LAG-2 | (MID = 31, Port ID = 5) |
| | (MID = 45, Port ID = 3) |

In another embodiment, MAC address tables in a node or network management application may not include the HDI for the logical aggregation groups. The user displayed MAC address table may only include HDI for fixed ports and thus are similar for both Aggregation switches 106.

| Aggregation switch A | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

| Aggregation switch B | | | |
|---|---|---|---|
| MAC | LAG | LAG ID | HDI |
| a1 | Yes | LAG1 | N/A |
| b1 | Yes | MC-LAG1 | N/A |
| c1 | Yes | MC-LAG-2 | N/A |
| d1 | No | — | (MID = 45, Port ID = 4) |

The MAC/HDI forwarding tables are synchronized with respect to the LAG identifiers associated with the source MAC addresses automatically as traffic flows over the VFL 124. As such, logically, the aggregation switches 106 operate as a single bridge for MAC learning. Furthermore, since MAC learning occurs automatically as traffic flows over the VFL 124, it requires minimum Layer 2/control module management software intervention without the need for inter-process communication message-based MAC table synchronization.

Figure 8:
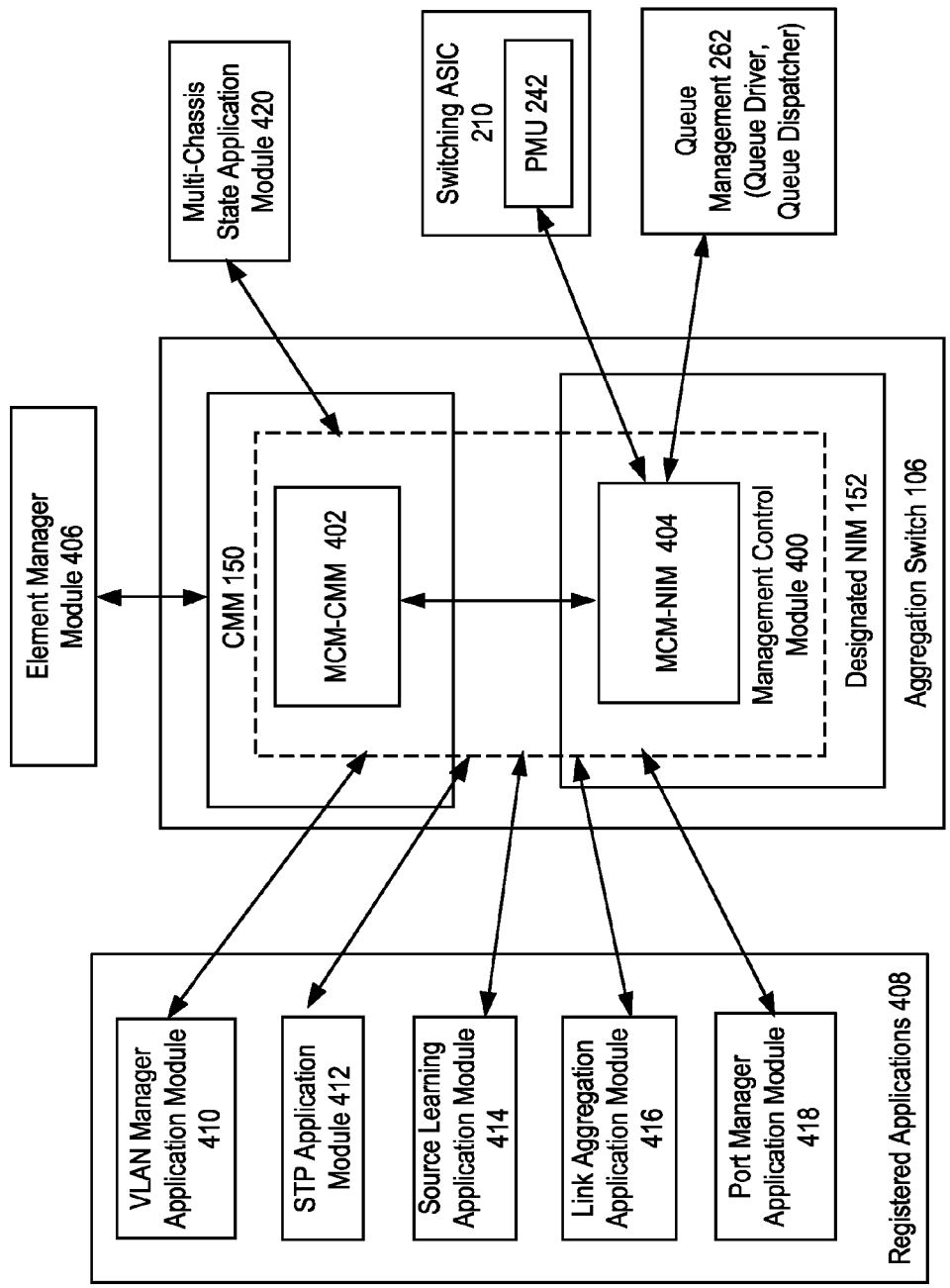
FIG. 8 illustrates a schematic block diagram of an embodiment of a management control module of an aggregation switch in accordance with the present invention.

FIG. 8 illustrates a schematic block diagram of an embodiment of a management control module (MCM) 400 for the aggregation switch 106. In an embodiment, the MCM 400 is implemented in a central management module (CMM) 150 of the Aggregation switch 106 (shown as MCM-CMM 402) or in a processing module in a designated network interface module (MM) 152 of the Aggregation switch 106 (shown as MCM-NIM 404) or in a combination thereof.

In an embodiment, the MCM-CMM 402 includes an interface between the MCM 400 and element and/or network manager module 406 as well as an interface to other applications 408 registered with MCM 400 operable on the Aggregation switch 106. The registered applications 408 include, for example, VLAN Manager Application module 410, Spanning Tree Protocol (STP) application module 412, Source Learning application module 414, Link Aggregation application module 416 and Port Manager application module 418. Additional or different applications may also coordinate and operate with the MCM 400 to provide the functions described herein.

The MCM 400 coordinates with the registered applications 408 to provide a wide range of notifications. For example, the MCM 400 informs the registered applications 408 about the status of the multi-chassis system and when to operate in the multi-chassis mode and when to operate in a stand-alone mode. The status information is driven by management configuration on the local and remote aggregation switch or by runtime decision taken by the aggregation switches individually or by both of the aggregation switches within the multi-chassis system upon control data exchange, negotiation and agreement.

The MCM 400 also requests services from the registered applications 408. For example, the MCM 400 requests VLAN Manager 410 to configure VFL member ports as members of a multi-chassis control VLAN to set up the inter-process communication channel between the multi-chassis peer switches. The STP application module 412 includes a spanning tree protocol such as, the spanning tree protocol defined in IEEE 802.1D Standard for Local and metropolitan area networks: Media Access Control (MAC) Bridges, 2004 edition, the multiple spanning tree protocol as defined in IEEE 802.1Q, Virtual Bridged Local Area Networks, 2005 edition or other similar type of network protocol for alleviating packet loops due to multiple active paths in a network. The Source Learning application module 414 coordinates updating and learning of the MAC/HDI forwarding tables in the aggregation switch. The Link Aggregation Module 416 performs LACP or other similar protocol to configure, negotiate and group member ports into link aggregates (LAG) and multi-chassis link aggregate groups (MC-LAG). The Port Manager application module 418 monitors status of the port interfaces 240.

In an embodiment, the MCM-CMM 402 selects a designated NIM 152 to perform management control functions related to the multi-chassis protocol. For example, the multi-chassis protocol allows the aggregation switches 106 to discover each other, elect a master switch, exchange system information and perform periodic health checks. Use of a designated NIM 152 avoids centralizing the functions of the MCM application 400 only at the CMM 150. In addition, the MCM-CMM 402 selects a back-up designated NIM 152 in case of failure in the primary designated NIM 152. In an embodiment, the designated NIMs are selected based on the lowest operational slot number.

In an embodiment, the MCM 400 includes a multi-chassis state application module 420 for the control and management of the Virtual Fabric Link (VFL) 124. The multi-chassis state application module 420 manages and configures the VFL 124 and interfaces with the port manager application module 418 to monitor and/or control the state of the VFL 124 and its member ports. The MCM-CMM 402 and the MCM-NIM 404 register with port manager application module 418 to receive port state and link state events about the member ports and links of the VFL 124. The multi-chassis state application module 420 tracks the state of each VFL member port using a standard LACP protocol, or other similar protocol, along with the state of the link at the physical level. In addition to the LACP protocol, a multi-chassis status protocol performs periodic keep-alive checks (hello protocol) in order to check the status and/or operability of components running on the designated NIM on both multi-chassis switches. The MCM 400 tracks the operational state of VFL 124 and processes events about the VFL status, i.e. aggregate created/deleted/up/down.

The MCM-CMM 402 and/or MCM-NIM 404 include one or more processing devices, such as a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The MCM-CMM 402 and/or MCM-NIM 404 include a memory that is an internal memory or an external memory. The memory of the MCM-CMM 402 and/or MCM-NIM 404 may be a single memory device or a plurality of memory devices. Such a memory device may be a read-only memory, random access memory, volatile memory, non-volatile memory, static memory, dynamic memory, flash memory, cache memory, and/or any device that stores digital information. The MCM-CMM 402 and/or MCM-NIM 404 may implement one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The MCM-CMM 402 and/or MCM-NIM 404 may execute hard-coded and/or software and/or operational instructions stored by the internal memory and/or external memory to perform the steps and/or functions described herein. The MCM-CMM 402 and/or MCM-NIM 404 may be implemented in a single or in one or more integrated circuits.

In a multi-chassis system 140, failure of connectivity of the virtual fabric link between aggregation switches 106 creates a severe impact to the stability of the network. The issues depend on the particular topology, but include for example, connectivity loss, unnecessary flooding and MAC movement. These issues may cause high bandwidth usage and high processing utilization on the aggregation switch 106, as well as looped packets and duplicate packets. In addition, edge nodes 104 that are connected to the multi-chassis system 140 via a single attachment may have a traffic impact due to VFL 124 failure. Since part of the traffic exchanged to/from a singly-attached edge node 104 may originally (before the failure) have to flow through the VFL 124 to reach its destination, this traffic will now be lost.

Another issue that occurs upon VFL 124 failure is eternal flooding due to unsynchronized MAC tables on the aggregation switches 106. Data forwarding, while functional, may not be optimal since one of the aggregation switches 106 may never learn some of the MAC addresses when a given upstream packet flow from an edge node 104 is transmitted through a different aggregation switch compared to the downstream traffic from the a core network node 116 in the multi-chassis system 140, resulting in flooded traffic that would normally not be flooded. To attempt to avoid these and other problems upon a VFL 124 failure, a process and system for recovery is described herein with respect to FIGS. 9-17.

Figure 9:
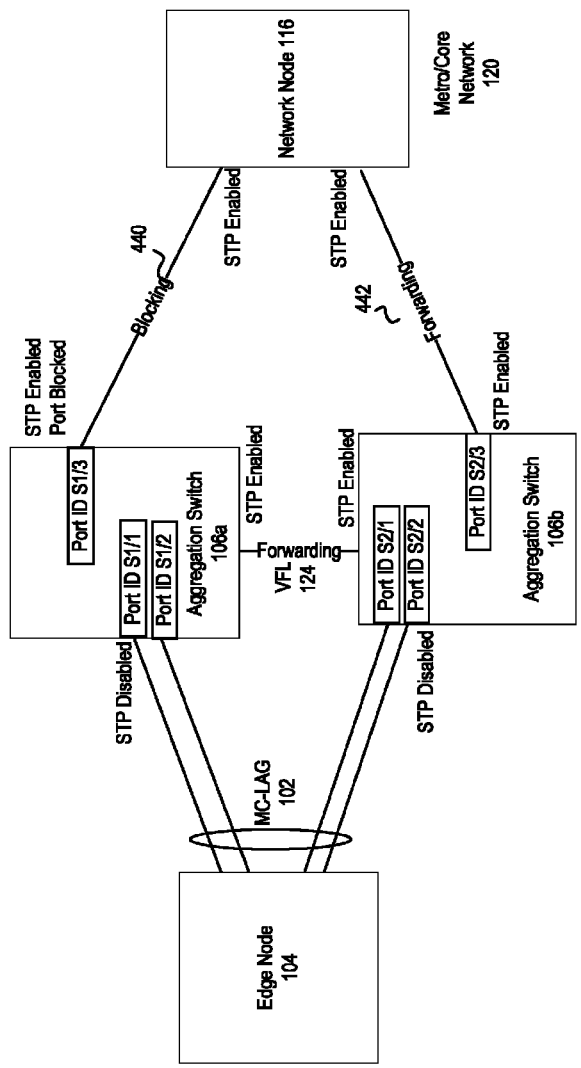
FIG. 9 illustrates a schematic block diagram of an embodiment of a link status in a multi-chassis system when a virtual fiber link is operational in accordance with the present invention.

FIG. 9 illustrates an embodiment of the link status of the aggregation switches 106 when the VFL 124 is operational. In multi-chassis mode, when the VFL 124 is operational, a spanning tree protocol is automatically disabled on the MC-LAG member ports, e.g. ports S1/1 and S1/2 in Aggregation switch 106a and ports S2/1 and S2/2 in Aggregation switch 106b in FIG. 9. From the edge node 104, the links of the MC-LAG 102 coupled to the aggregation switches 106a and 106b are part of a single link aggregate group (LAG) to a single logical node. The spanning tree protocol is enabled in the portion of the network between the aggregation switches 106 and nodes in the metro/core network, such as network node 116. In addition, the spanning tree protocol is enabled in the VFL member ports and configured to be in a forwarding state.

To prevent loops between the aggregation switches 106 and the network node 116, the spanning tree protocol determines one or more ports for forwarding packets from the aggregation switches 106 and one or more ports that are blocked from forwarding packet flows from the aggregation switches 106. The packet flows may be part of a VLAN and multiple spanning tree protocol implemented to select ports on the aggregation switches for forwarding and blocking for each VLAN. For example, STP is enabled on port interface S1/3 and port interface S2/3. To prevent loops for a packet flow, such as for a packet flow for a VLAN, port interface S1/3 has been blocked from transmitting or receiving packets for the packet flow or VLAN. Such packets are dropped by the port interface S1/3. So link 440 between aggregation switch 106a and network node 116 is in a blocking state for the packet flow.

The aggregation switches 106 are operable to detect a connection failure of the VFL. For example, The MCM-CMM 402 and the MCM-NIM 404 register with port manager application module 418 to receive port state and link state events about the member ports of the VFL 124. Or in another embodiment, the multi-chassis state application module 420 tracks the state of each VFL member port using a standard LACP protocol, or other similar protocol, along with the state of the link at the physical level. In addition to the LACP protocol, the multi-chassis state application module 420 may perform periodic keep-alive checks (hello protocol) in order to check the status of the VFL 124 on the aggregation switches 106. The MCM 400 is thus operable to track the operational state of VFL 124 and process events about the VFL status, i.e. aggregate created/deleted/up/down.

Figure 10:
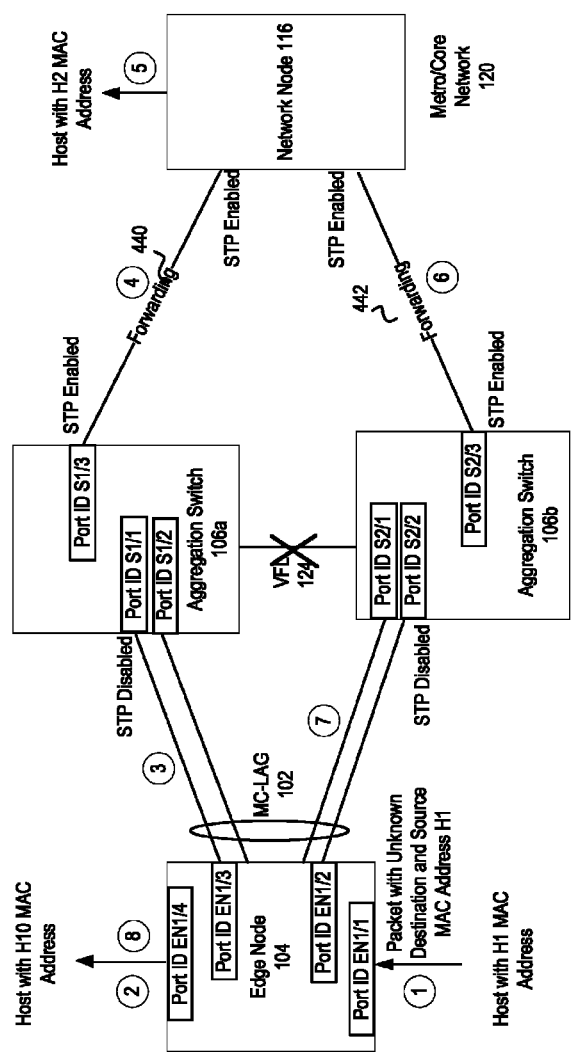
FIG. 10 illustrates a schematic block diagram of an embodiment of a link status in a multi-chassis system in the event of a connection failure of the virtual fiber link in accordance with the present invention.

FIG. 10 illustrates an embodiment of the link status of the multi-chassis system 140 in the event of a connection failure of the VFL 124, e.g. aggregation switch 106a is no longer able to communicate over the VFL 124 to aggregation switch 106 b. A problem that occurs is that the aggregation switches 106 may not learn MAC addresses for a given upstream packet flow from an edge node 104 that is transmitted through a different aggregation switch compared to the downstream packet flow from a core network node 116. The aggregation switches 106 are still a logical single bridge from the standpoint of the MAC address table content for the edge node 104. And since the virtual fabric link 124 is not operational, the aggregation switches 106 are not able to synchronize their MAC table entries.

For example, a data packet with a source MAC address of H1 enters the edge node 104 at port EN1/1 with an unknown destination in step 1. The edge node 104 updates its MAC table to learn that source address H1 can be reached through port EN1/1. The edge node 104 then floods the packet to its output ports, such as to Port ID EN1/4 to Host H10 in step 2. In addition, since the MC-LAG 102 is still configured, the edge node views the two aggregation switches 106 as a single MAC entity and selects one of the member ports of the MC-LAG 102 to flood the packet, such as port EN1/3 to aggregation switch 106a in step 3. Aggregation switch 106a transmits the packet to the network node 116 over link 440 in step 4 which delivers the packet to Host H2 in step 5. However, the network node 116 also floods the packet to aggregation switch 106b over link 442 in step 6. From aggregation switch 106b, the packet is transmitted back to the edge node 104 in step 7. The packet, for example, ingresses on another MC-LAG port EN1/2. The edge node 104 then updates its MAC address table to learn that source address H1 can be reached through MC-LAG 102. The MAC address H1 was correctly learned as reachable through port EN1/1, but now it is incorrectly relearned as reachable through the MC-LAG 102.

In addition, in step 8, the packet received back from MC-LAG 102 is flooded again to host H10 Host H10 then also relearns that the source MAC address H1 is reachable via the MC-LAG 102 instead of edge node port EN1/1. Connectivity between Hosts H1 and H10 may be lost. As seen in this example, when the VFL 124 is down, a flooded packet may loop back to the edge node 104 and cause incorrect MAC movement.

Figure 11:
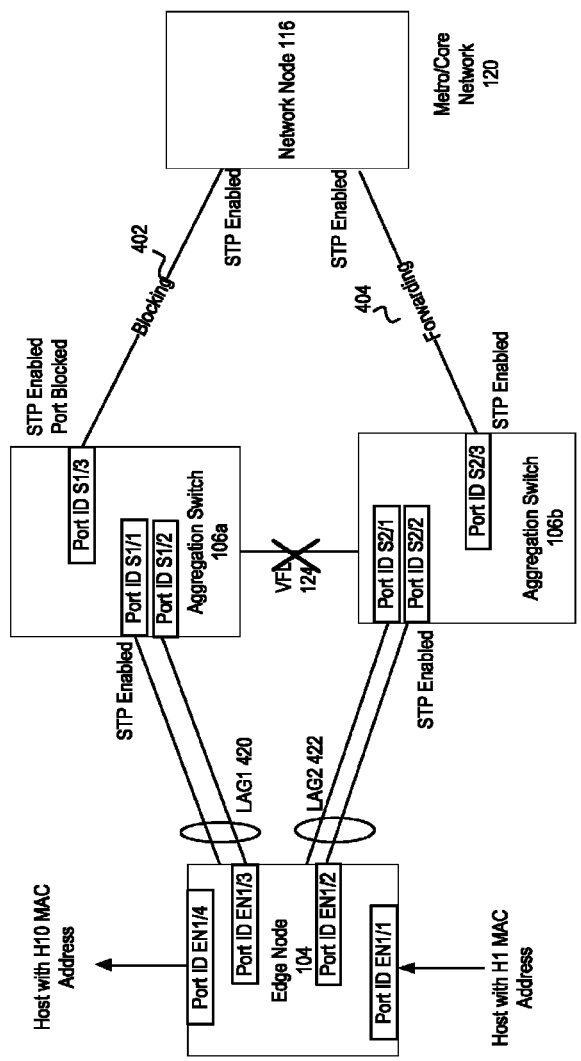
FIG. 11 illustrates a schematic block diagram of an embodiment for recovery when a connection failure occurs over the virtual fiber link in accordance with the present invention.

FIG. 11 illustrates an embodiment for recovery when a connection failure occurs over the VFL 124. The embodiment helps alleviate one or more of the problems described herein. In an embodiment, when the aggregation switches 106 determine that a connection failure has occurred such that the aggregation switches 106 are not able to communicate over the VFL 124, the aggregation switches 106 then reconfigure the MC-LAG 102 into one or more link aggregates connected to the edge node 104. In an embodiment, the MC-LAG 102 is reconfigured into at least two link aggregates, wherein at least one link aggregate LAG1 420 is connected from the edge node 104 to Aggregation switch 106a and at least one other link aggregate LAG2 422 is connected from the edge node 104 to Aggregation switch 106b. Next, the aggregation switches 106 enable a spanning tree protocol on the link aggregates LAG1 420 and LAG2 422 connected to the edge node 104 as well as between the aggregation switches 106 and the core network 120. The spanning tree protocol includes for example, the spanning tree protocol defined in IEEE 802.1D Standard for Local and metropolitan area networks: Media Access Control (MAC) Bridges, 2004 edition, the multiple spanning tree protocol as defined in IEEE 802.1Q, Virtual Bridged Local Area Networks, 2005 edition or other similar type of network protocol for alleviating packet loops due to multiple active paths in a network.

When the aggregation switches 106 reconfigure the MC-LAG 102 into one or more link aggregates connected to the edge node 104, the MAC table entries previously learned on the member ports of the MC-LAG 102 are flushed in both the aggregation switches 106 and the edge node 104. New MAC entries are learned for the newly formed link aggregates LAG1 420 and LAG 2 422. The aggregation switches 106 are also assigned different MAC addresses and are viewed as two independent logical entities by the edge node 104. The aggregation switches 106 are now operational in a standalone mode and no longer need to synchronize MAC table entries over the VFL 124.

In addition, the spanning tree protocol enabled on the link aggregates coupled to the edge node 104 and the links 440, 442 coupled to the network node 116 helps prevent loops by placing one or more ports in a blocking state. For a particular packet flow or VLAN or all traffic, the spanning tree protocol determines an active path through the network and blocks one or more other paths to prevent loops. In an example shown in FIG. 11, Port ID S1/3 in aggregation switch 106a is placed in a blocking state and Port S2/3 in aggregation switch 106b is placed in a forwarding state. In another example, the spanning tree protocol may determine to place Port ID S2/3 in aggregation switch 106b in a blocking state and Port S1/3 in aggregation switch 106a in a forwarding state for a packet flow or VLAN. The spanning tree protocol may determine the active paths on a VLAN basis, such as with multiple spanning tree protocol, or for all traffic flows.

By enabling the spanning tree protocol on the link aggregates LAG1 420 and LAG2 422, packets loops are deterred. MAC movement at the edge node 104 is prevented since the data packets originating from H1 do not loop back. As a result, the connectivity between H1 and H10 (as well as other hosts) is stable.

FIG. 12 illustrates a logical flow diagram of an embodiment of the method for recovery when the connection failure occurs over the VFL 124. In step 502, a connection failure is detected by an aggregation switch 106 such that the aggregation switch 106 is not able to communicate to the remote aggregation switch over the VFL 124. In an embodiment, port manager application module 418 in the aggregation switch 106 receives port state and link state events about the member ports of the VFL 124 and reports the failure to the MCM 400 of the aggregation switch 106. Or in another embodiment, the multi-chassis state application module 420 of the aggregation switch 106 tracks the state of each VFL member port using a standard LACP protocol, or other similar protocol, along with the state of the link at the physical level. In another embodiment, the multi-chassis state application module 420 may perform periodic keep-alive checks (hello protocol) in order to check the status of the VFL 124. The aggregation switch 106 may also use other methods or applications to track the operational state of the VFL 124 and determine the VFL status.

When the aggregation switch 106 determines that a connection failure of the VFL has occurred, the aggregation switch 106 reconfigures one or more of its set of member ports of MC-LAG 102 into at least one link aggregate coupled to the edge node in step 504. In step 506, a spanning tree protocol or other similar type of network protocol for alleviating packet loops due to multiple active paths in a network is enabled on the link aggregate.

FIG. 13 illustrates a logical flow diagram of an embodiment of a method for reconfiguration of the member ports of MC-LAG 102 on one of the aggregation switches 106 in more detail. In step 510, the link aggregation application module 416 of the aggregation switch 106 reconfigures link parameters of a set of the member ports of the MC-LAG 102 to values corresponding to a link aggregate. In an embodiment, the link parameters include parameters such as those described by the Link Aggregation Control Protocol (LACP) which was formerly clause 43 of the IEEE 802.3 standard added in March 2000 by the IEEE 802.3ad task force and is currently as incorporated in IEEE 802.1 AX-2008 on Nov. 3, 2008. Other similar types of link aggregation protocols may also be implemented. The set of member ports of the MC-LAG 102 reconfigured includes one or more of the member ports of the MC-LAG 102. Additional ports of the aggregation switch 106 may also be reconfigured with the set of member ports of the MC-LAG 102 into the newly formed link aggregate coupled to the edge node 104.

In an embodiment, link parameters for a stand-alone mode and a multi-chassis mode are pre-configured by a system administrator. Alternatively, the link parameters are automatically determined by the aggregation switch 106. For example, the Link Aggregation application module 416 may be configured to select a set of link parameters for standalone mode and/or multi-chassis mode. The standalone link parameters are implemented when the aggregation switch is operating in a stand-alone mode, such as when the VFL 124 has a connection failure. The multi-chassis link parameters are implemented when the aggregation switch is operating in a multi-chassis mode and the VFL 124 is operational. An example of the link parameters in standalone mode and multi-chassis mode are illustrated in the table below.

| Link Parameter | Standalone Mode | Multi-Chassis Mode |
| --- | --- | --- |
| System identifier | Aggregation switch 106a assigned a first MAC address Aggregation switch 106b assigned a second, different MAC address | Aggregation switches 106a and 106b assigned a same MAC address (e.g. base/router MAC address of the primary aggregation switch) |
| Actor administrative key | Aggregation switch 106a configured with set of standalone keys for a link aggregate Aggregation switch 106b configured with set of standalone keys for a link aggregate | Aggregation switches 106a and 106b configured with a set of multi-chassis keys |

The link aggregation application module 416 reconfigures a set of the MC-LAG member ports with a second different system identifier and actor administrative key for a link aggregate. These member ports are re-grouped into a new link aggregate coupled to the edge node 104. One or more new link aggregates may be formed from the set of the MC-LAG member ports. The aggregation switch 106 exchanges the system identifier and administrative keys using LACP or other type of link aggregate protocol through the newly configured link aggregate member ports and across the member links of the newly configured link aggregate to neighboring devices. As a result, the edge node 106 detects the change from MC-LAG 102 to a link aggregate. Then, the edge node 106 reconfigures its member ports of the link aggregate with a new set of link parameters. The change in link parameters will cause the member ports using LACP or other type of link aggregate protocol to renegotiate and form the newly configured link aggregate, e.g. LAG1 420 or LAG2 422 in FIG. 11.

In addition, when the reconfiguration of the MC-LAG 102 to one or more link aggregates is detected in step 512, MAC table entries for the MC-LAG are flushed in step 514. New MAC table entries are learned for the newly configured link aggregate, e.g. LAG1 420 or LAG2 422, in step 516.

FIG. 14 illustrates a logical flow diagram of an embodiment of a method for STP enablement by one of the aggregation switches 106 in more detail. The STP application module 412 of the aggregation switch 106 registers for notification of status of the VFL 124. When the STP application module 412 receives notification that the VFL 124 is "down" or other event that indicates a connection failure of the VFL 124, the STP application module enables STP operation on the newly configured link aggregate member ports in step 520. The STP application module 412 determines one or more active paths through the network for one or more packet flows in step 522, such as on a per VLAN basis, and blocks one or more other paths to prevent loops for the packet flow in step 524.

FIG. 15 illustrates a logical flow diagram of an embodiment of a method for returning to multi-chassis mode by one of the aggregation switches 124 when the VFL 124 becomes operational again. The aggregation switch 106 detects that the VFL 124 is again operational and is able to communicate with the remote aggregation switch in step 526. The link aggregation application module 416 reconfigures one or more of the link aggregate member ports to a system identifier and actor administrative key for a MC-LAG. These member ports are re-grouped with one or more member ports of the remote aggregation switch into a MC-LAG 102 coupled to the edge node 104 in step 528. The aggregation switch 106 exchanges the system identifier and administrative keys using LACP or other type of link aggregation protocol through the member ports and across the member links of the newly configured MC-LAG to the edge node 106. As a result, the edge node 106 detects the change from a link aggregate to MC-LAG. Then, the edge node 106 reconfigures its member ports to an MC-LAG. The change in link parameters will cause the member ports using LACP or other type of link aggregation protocol to renegotiate and form MC-LAG 102. In addition, when the reconfiguration of the MC-LAG member ports is detected, MAC table entries for the link aggregates, e.g. LAG1 420 and LAG2 422, are flushed. New MAC table entries are learned for the newly formed MC-LAG. In step 530, STP is disabled on member ports of the newly formed MC-LAG. The aggregation switches 106 then operate in a multi-chassis mode and synchronize MAC table entries over the VFL 124 as described herein.

FIG. 16 illustrates a logical flow diagram of an embodiment of a method for operating in stand-alone mode by an aggregation switch 106. As described above, the reconfiguration of the aggregation switches 106 from multi-chassis mode to stand-alone mode is initiated upon detection of a connection failure of the VFL 124. In another embodiment, the reconfiguration of the aggregation switches 106 from multi-chassis mode to stand-alone mode is initiated by a stand-alone command from a system administrator. For example, a system administrator may need to reconfigure one of the aggregation switches 106 to stand-alone mode even when the VFL 124 is operational, e.g. to perform maintenance on the remote aggregation switch. In step 532, aggregation switch 106 receives a stand-alone command from an element manager module 406. The aggregation switch 106 then reconfigures a set of the member ports of the MC-LAG 102 into one or more link aggregates connected to the edge node 104 in step 534. Next, the aggregation switch 106 enables a spanning tree protocol on the one or more link aggregates to the edge node 104 in step 536. The aggregation switch 106 blocks forwarding of packets over the VFL 124 since synchronization of MAC tables is not needed in stand-alone mode. The aggregation switch 106 then continues to operate in a stand-alone mode until it receives a command to again initiate multi-chassis mode.

The reconfiguration of the aggregation switches from stand-alone mode to multi-chassis mode is initiated by a multi-chassis command from a system administrator. FIG. 17 illustrates a logical flow diagram of an embodiment of a method for operating in multi-chassis mode by an aggregation switch 106. In step 540, aggregation switch 106 receives a command to operate in multi-chassis mode. One or more ports of the aggregation switch 106 is re-grouped with one or more ports of the remote aggregation switch into a MC-LAG 102 coupled to the edge node 104 in step 542. In step 544, STP is disabled on member ports of the MC-LAG 102. The aggregation switches 106 then operate in a multi-chassis mode and again forward packets with pre-pended headers over the VFL 124 to synchronize MAC table entries between the aggregation switches 106.

Reconfiguration of the aggregation switches 106 to a stand-alone mode addresses problems that occur when a virtual fabric link 124 becomes in-operational in a multi-chassis system. The embodiment helps alleviate connectivity loss, unnecessary flooding, MAC movement, looped packets and duplicate packets. The embodiment helps provide high-availability and resilience in the multi-chassis system.

As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. An aggregation switch in a multi-chassis system, comprising:
   a first set of member port interfaces of the aggregation switch grouped with one or more member port interfaces of a remote aggregation switch configured to form a multi-chassis link aggregate, wherein the multi-chassis link aggregate couples the aggregation switch and the remote aggregation switch to an edge node;
   a second set of port interfaces configured to form a virtual fiber link for coupling the aggregation switch to the remote aggregation switch;
   a processing module operable to:
      determine a connection failure of the virtual fiber link to the remote aggregation switch;
      reconfigure one or more of the first set of port interfaces of the the multi-chassis link aggregate to form a link aggregate for coupling to the edge node; and
      initiate a spanning tree protocol in the one or more of the first set of port interfaces.

2. The aggregation switch of claim 1, wherein the remote aggregation switch is in a separate physical chassis.

3. The aggregation switch of claim 1, wherein the processing module is operable to reconfigure the first set of port interfaces to the link aggregate by:
   re-assigning link parameters designating the first set of ports as a multi-chassis link aggregate to link parameters designating the first set of ports as a link aggregate.

4. The aggregation switch of claim 3, wherein the first set of ports are each operable to:
   detect change of link parameters to a link aggregate;
   flush MAC table entries; and
   re-populate MAC table entries as part of the link aggregate.

5. The aggregation switch of claim 1, wherein the processing module is operable to initiate a spanning tree protocol in the first set of port interfaces by:

enabling spanning tree protocol on the first set of port interfaces;
identifying a loop through the aggregation switch of packets belonging to a virtual local area network; and
blocking forwarding of packets belonging to the virtual local area network on one or more port interfaces of the aggregation switch to prevent the identified loop.

6. The aggregation switch of claim 1, wherein the first set of port interfaces is operable to:
receive an incoming packet, wherein the packet includes a destination address;
determine destination hardware device information corresponding to a hardware device on the remote aggregation switch based on the destination address of the incoming packet;
generate a packet with pre-pended header from the incoming packet, wherein the pre-pended header includes the destination hardware device information; and
transmit the packet with pre-pended header to the second set of port interfaces for transmission to the remote aggregation switch over the virtual fabric link.

7. The aggregation switch of claim 6, wherein the second set of port interfaces is operable to:
determine a failure of the virtual fiber link; and
block forwarding of packets over the virtual fiber link.

8. A method in a switch, comprising:
communicating with an end node over a first set of port interfaces in the switch, wherein the first set of ports are configured to form a multi-chassis link aggregate with one or more port interfaces of a remote switch to the end node;
communicating with the remote switch over a second set of port interfaces in the switch configured to form a virtual fiber link;
determining a connection failure of the virtual fiber link to the remote switch;
reconfiguring the first set of port interfaces of the multi-chassis link aggregate to form a link aggregate; and
initiating a spanning tree protocol in the first set of port interfaces.

9. The method of claim 8, wherein reconfiguring the first set of port interfaces to a link aggregate comprises:
re-assigning link parameters designating the first set of ports as a multi-chassis link aggregate to link parameters designating the first set of ports as a link aggregate.

10. The method of claim 9, further comprising:
detecting a change of link parameters to a link aggregate by the first set of port interfaces;
flushing MAC table entries by the first set of port interfaces; and
re-populating the MAC table entries as part of the link aggregate.

11. The method of claim 8, wherein initiating a spanning tree protocol in the first set of port interfaces comprises:
enabling the spanning tree protocol on the first set of port interfaces;
identifying a loop through the switch of packets belonging to a virtual local area network; and
blocking forwarding of packets belonging to the virtual local area network on one or more port interfaces of the switch to prevent the identified loop.

12. The method of claim 8, further comprising:
receiving an incoming packet by one of the first set of port interfaces, wherein the packet includes a destination address;
determining destination hardware device information corresponding to a hardware device on the remote switch based on the destination address of the incoming packet;
generate a packet with pre-pended header from the incoming packet, wherein the pre-pended header includes the destination hardware device information; and
transmit the packet with pre-pended header to the second set of port interfaces for transmission to the remote switch over the virtual fabric link.

13. The method of claim 12, further comprising:
determining a failure of the virtual fiber link by the second set of port interfaces; and
blocking forwarding of packets over the virtual fiber link.

14. The method of claim 8, wherein the remote switch is in a separate physical chassis.

15. A method in a switch, comprising:
operating in a multi-chassis mode, wherein operating in a multi-chassis mode includes:
communicating with an end node over a first set of port interfaces in the switch, wherein the first set of ports are configured to form a multi-chassis link aggregate with one or more port interfaces of a remote switch to the end node;
communicating with the remote switch over a second set of port interfaces in the switch configured to form a virtual fiber link;
receiving a command to operate in a stand-alone mode;
in response to the command, reconfiguring a plurality of the first set of port interfaces of the multi-chassis link aggregate to form a link aggregate and initiating a spanning tree protocol in the plurality of the first set of port interfaces.

16. The method of claim 15, further comprising:
determining link parameters for operating in the stand-alone mode from a pre-determined table, wherein the link parameters for operating in the stand-alone mode include link parameters for the link aggregate and a system identifier that is different from the system identifier of the remote aggregation switch.

17. The method of claim 16, wherein reconfiguring the plurality of the first set of port interfaces to the link aggregate comprises:
re-configuring the plurality of the first set of ports with the link parameters for the link aggregate.

18. The method of claim 17, further comprising:
detecting the reconfiguration of the plurality of the first set of port interfaces to the link aggregate;
flushing MAC table entries by the first set of port interfaces associated with the multi-chassis link aggregate; and
re-populating the MAC table entries for the link aggregate.

19. The method of claim 15, wherein initiating the spanning tree protocol in the first set of port interfaces comprises:
enabling the spanning tree protocol on the first set of port interfaces;
identifying an active path for a packet flow through the switch; and
blocking forwarding of packets in the packet flow on one or more port interfaces of the switch for one or more other paths.

20. The method of claim 19, further comprising:
blocking forwarding of packets over the virtual fiber link.

* * * * *